Dec. 1, 1959  I. P. MAGASINY  2,915,741
AUTOMATIC COMPENSATION IN A TELEMETRIC SYSTEM
Filed Nov. 16, 1955  3 Sheets-Sheet 1

INVENTOR.
IRVING P. MAGASINY
BY Edward M. Farrell
ATTORNEY

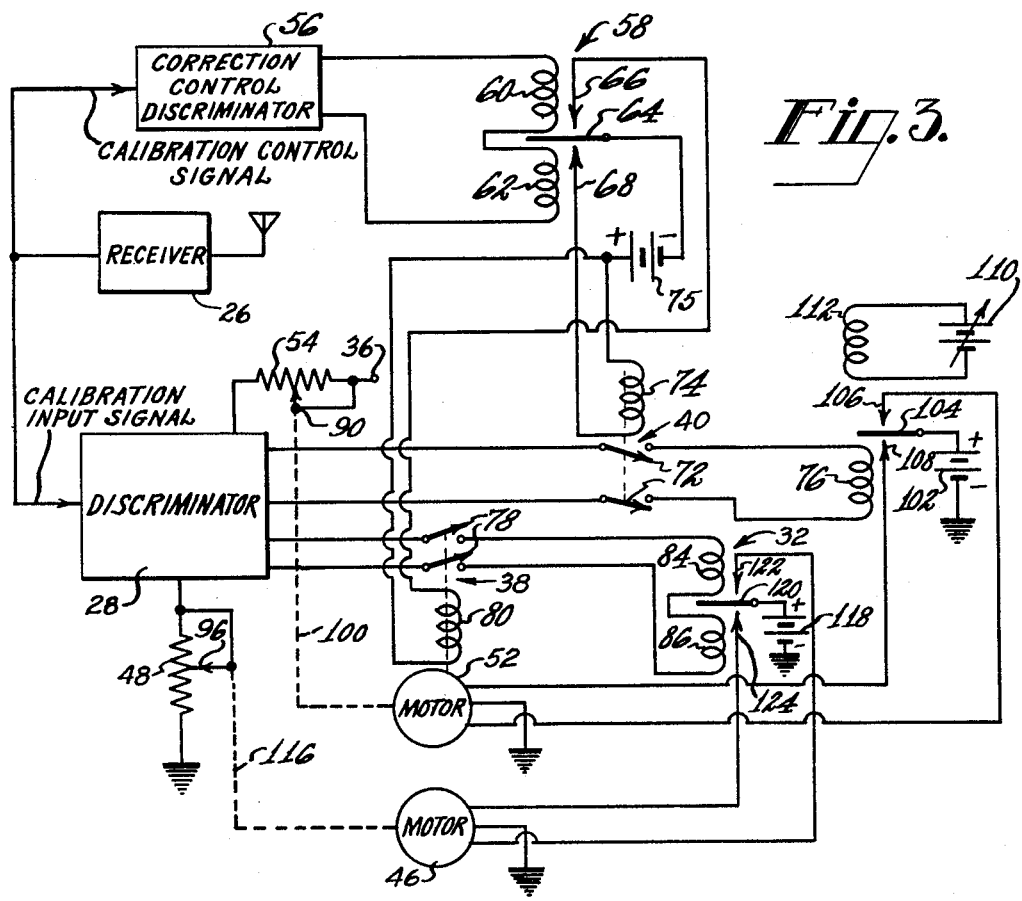

United States Patent Office 2,915,741
Patented Dec. 1, 1959

2,915,741

AUTOMATIC COMPENSATION IN A TELEMETRIC SYSTEM

Irving P. Magasiny, Philadelphia, Pa., assignor to Tele-Dynamics Inc., a corporation of Pennsylvania Application November 16, 1955, Serial No. 547,266

3 Claims. (Cl. 340—207)

This invention relates to telemetric systems, and more particularly to means for compensating for inaccuracies resulting from variations or drifts in such systems.

In many types of telemetric systems associated with guided missiles, pilotless aircraft or projectiles, for example, recordations, or measurements of acceleration, temperature, pressure, current and other variable quantities are often necessary. In such systems, a plurality of pickups is often used to convert the variable quantities into corresponding electrical signals which are used to frequency modulate a subcarrier oscillator. The output voltages from the sub-carrier oscillators are combined by suitable circuit means and applied to a modulator circuit of a radio transmitter which, in turn, excites a transmitting antenna.

The transmitted signal is recovered by a receiver, which may be on the ground or at another remote point, which converts the transmitted signal into a composite sub-carrier voltage. Bandpass filters are then generally used to separate the individual sub-carrier voltages from the composite voltage. Each filtered voltage is then applied to an individual sub-carrier frequency discriminator which produces a varying direct current output voltage.

The direct current output voltage from each discriminator corresponds to a variable quantity at one of the pickups. The discriminator output voltages may be recorded by suitable recording means for analysis at a later date or may be automatically converted into a form to given an instantaneous indication of the value of the variable quantity measured.

In the telemetric systems of the character described, any change in the sub-carrier oscillator power or freqeuncy drifts, any change of amplification anywhere in the telemetric system, or variation of attenuation within the transmission medium between the transmitter and receiver will cause a corresponding change in the output voltage at the discriminator circuit thereby introducing inaccuracy within the system. This is true since the output voltage from the discriminator circuit does not correspond to the information picked up at the transmitting station.

In order to compensate for inaccuracy resulting from any of the aforementioned causes, means have been employed heretofore for periodically checking the accuracy of telemetering equipment which is independent of any changes of amplification or of quiescent energy level or noise occurring in the amplifiers at the sending or receiving end. Also, systems have heretofore incorporated means for calibrating telemetering equipment which is independent of any frequency drift resulting from normal variations in the sub-carrier oscillator voltage or from temperature changes.

In systems employing compensating means for checking or calibrating telemetering equipment, calibration signals are generally transmitted to the receiver. A first set of calibration signals are utilized to provide means for balancing a discriminator circuit for zero output voltage for a received calibration sub-carrier signal, at periodic intervals. A second set of calibration signals is utilized to adjust the sensitivity or output voltage of a discriminator circuit when a predetermined reference voltage is applied to the sub-carrier oscillator during the calibration cycle. The second set of calibration signals is also transmitted at periodic intervals.

The output voltage representing a sub-carrier signal is generally recorded on magnetic tape or by any other suitable means. The calibration signals recorded during the calibration cycle provide points of reference. The normal information signals corresponding to the signals at the pickups are also recorded. The recorded information signals are compared with the points of reference provided by the calibration signals. Allowances are made for the differences in the points of reference for different calibration cycles and relatively accurate indications of the information signals are attainable.

Manual adjustments of the sensitvity and balancing controls in a discriminator circuit is often inconvenient and does not assure highest accuracy due to the possibility of human error. Also, when dealing with recorded information, it is often inconvenient to make calculations or to use additional means to compensate for differences in the reference levels provided by the calibration signals.

It is an object of this invention to provide automatic means for varying the center frequency response of a discriminator circuit to compensate for oscillator frequency drifts and other variations in a telemetering system.

It is a further object of this invention to provide automatic means for varying the output voltage of a discriminator circuit to compensate for undesired variations in a telemetering system.

It is still a further object of this invention to provide means for sequentially automatically balancing and adjusting the sensitivity of a discriminator circuit.

In accordance with the present invention, a discriminator circuit is first automatically adjusted to the center frequency of a sub-carrier oscillator by a signal transmitted for calibration purposes. The output voltage from the discriminator circuit is compared with a zero reference voltage. The differential voltage between the discriminator output voltage and the zero reference voltage actuates a servo motor which adjusts a potentiometer to balance the discriminator circuit to zero output voltage. The sensitivity of the discriminator circuit is then automatically adjusted. A predetermined voltage is applied to the sub-carrier oscillator at the transmitter causing the frequency of the oscillator to shift. A signal of shifted frequency is then transmitted during the calibration cycle. The discriminator output circuit at the receiving end should then be equal to a standard reference voltage. The standard reference voltage is compared with the discriminator output voltage to provide a second differential voltage when the output voltage from the discriminator and the standard reference voltage are unequal. When the two voltages are unequal, the second differential voltage actuates a servo motor which adjusts a potentiometer to vary the sensitivity or output voltage of the discriminator circuit until its output voltage is equal to the standard reference voltage. Additional appropriate means are provided to connect the discriminator to the proper output circuits during the calibration cycle.

Other objects and advantages of the present invention will be apparent and suggest themselves to those skilled in the art from a reading of the following specification in connection with the accompanying drawings, in which:

Figure 3 is a schematic diagram, partly in block diagram form, illustrating an automatic compensation system, in accordance with the present invention;

Figure 4 is a schematic diagram of a discriminator circuit which may be embodied in the present invention.

Figure 1:
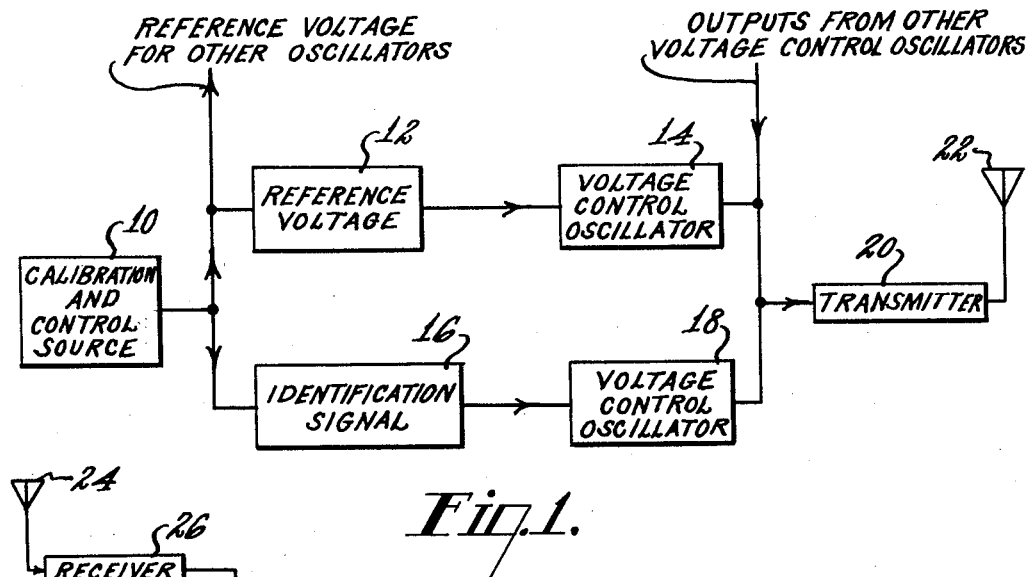
Figure 1 is a block diagram illustrating a portion of a telemetering transmitting station, in accordance with the present invention.

Referring particularly to Figure 1, control means, represented by a block 10, is used to control the transmission of calibration and identification signals at a transmitting station.

The control means 10 is connected to means for providing reference voltages, represented by a block 12. The reference voltages are applied to a voltage control oscillator, represented by a block 14. The control means 10 is also connected to means for providing an identification signal, represented by a block 16. The identification signals are applied to a voltage controlled oscillator, represented by a block 18. The control means 10 may also be connected to a plurality of other sources of reference voltages which may be applied to other voltage control oscillators within the system. The output voltages from the voltage control oscillators 14 and 18, as well as other oscillators within the system, are applied to a transmitter or tape or other type recorder, represented by a block 20, where they may be combined in a mixer circuit to provide a complex signal. The output complex signal from the transmitter is transmitted to a receiving station through an antenna 22.

In the embodiment shown, the voltage control oscillator 14 may be one of a plurality of sub-carrier oscillators which is subject to frequency shifts due to voltage instability of the power source or for other reasons. During normal operation in a telemetering system, the oscillator 14 may be associated with a transducer or pickup, which has an output voltage corresponding to a measured function such as speed, temperature, etc. The output voltage from the pickup, which may be amplified if necessary, may be utilized to frequency or phase modulate a sub-carrier oscillator such as the oscillator 14. The frequency modulation of the sub-carrier oscillator 14 corresponds to information signals at the pickup during normal operation of the telemetering system. The transmitted sub-carrier signal resulting from the oscillator 14 may be detected at the receiving station, reconverted to the original voltage variations at the pickup and made available for direct observation, recording or for automatic data separation. It is seen that if the sub-carrier oscillator 14 shifts from its normal operating or center frequency that the detected information at the receiving station will be inaccurate, since it will not correspond to the information signal at the pickup.

In many telemetering systems, the information voltage from a pickup may vary between 0 and 5 volts depending upon the variation of the measured quantity. In such systems, a voltage of 2.5 volts applied to a voltage control oscillator will produce an oscillator frequency which may be considered as the oscillator center frequency. During a period of calibration, one of the reference voltages from the source 12 may be 2.5 volts to provide a signal output from the oscillator 14, representing its center frequency. It is well known that subcarrier oscillators in telemetering systems have a predetermined frequency band of operation and that, in many conventional systems, application of 2.5 volts will produce a frequency in the center of this frequency band of operation. It is recognized, however, that the voltage applied to produce center frequency of an oscillator may be different for different oscillators or systems. Center frequency is generally defined as that frequency which will produce zero signal output volts at the discriminator.

If the discriminator circuit at the receiving station is balanced for a different center frequency than the one to which it was balanced to compensate for frequency drifts of a sub-carrier oscillator, additional means for compensating the sensitivity or output voltage of the discriminator must also be provided. For this reason, a second reference voltage from the source 12 is provided. The second reference voltage may be a predetermined value, such as 5 volts, which will vary the frequency of the oscillator 14 from its center frequency. The entire telemetering system is designed so that the predetermined voltage applied to the oscillator 14 should provide a predetermined output voltage from the discriminator at the receiving station.

During the calibration cycle, the reference voltages are sequentially applied to the oscillator 14 to provide the calibration or correction signals for the discriminator at the receiving station. The calibration signals are used to balance or to correct the discriminator circuit and to adjust its sensitivity.

The calibration cycle and time interval during which the reference voltages of known increments from the source 12 (such as the 2.5 and 5 volts previously mentioned) are substituted in place of the information signals is also determined by the control means 10. The control means may comprise a suitable mechanical or electrical device which is designed to disconnect the source of information signals from the sub-carrier oscillator 14 and to connect the source of reference voltages thereto. When more than a single reference voltage is to be applied to the sub-carrier oscillator for center frequency balancing and sensitivity adjustment, the control means 10 includes means for sequentially applying the reference signals to the oscillator. The receiving station must be adapted not only to receive the calibration signals during the calibration cycle but must also include means for determining and identifying the time and duration of the calibration signals. These means may be provided by the transmission of identification signals simultaneously with the transmission of the calibration signals, as will be seen.

In the system shown, the voltage control oscillator 18 is utilized for transmitting code or identification signals and is not normally associated with a transducer or pickup, as is the voltage control oscillator 14. During the calibration cycle, the control means 10 operates to connect the source of identification signals 16 to the oscillator 18. A separate discriminator at the receiving station not normally used to detect information signals may be used to detect the signal of the identification oscillator 18 during the calibration cycle, as will be seen.

Since the receiving station must be capable of determining the sequence and duration of the transmission of the calibration signals, one of the identification signals from the source 16 is applied to the oscillator 18 simultaneously with the application of one of the reference voltages to the oscillator 14. A second of the identification signals from the source 16 may be applied to the oscillator 18 simultaneously with the application of a second reference voltage to the oscillator 14.

The identification signals from the source 16 may comprise two voltages of different levels, for example 0 and 5 volts. When these voltages are sequentially applied to the oscillator 18, the oscillator will vary from a frequency lower than its center frequency to a frequency higher than its center frequency, assuming that the application of a voltage of 2.5 volts to the oscillator produces its center frequency. Means responsive to the calibration and identification signals at the receiving station are utilized to sequentially adjust the balancing and sensitivity of the discriminators which are normally operative to detect the information signals, as will be seen.

The output signals from the oscillators 14, 18 and other oscillators within the system may be combined by suitable means, as is known in many frequency division multiplexing systems, and are used to modulate a carrier oscillator included in the transmitter 20. A complex electrical signal comprising the sub-carrier oscillator signals are applied to the antenna 22 from the transmitter 20 for transmission to a receiving station.

It is not necessary that the voltage controlled oscillator 18 be employed. For example, tone signals from the identification signal source 16 may be applied directly to the transmitter 20, if desired. Numerous other ways of providing the identification signals are also possible.

Figure 2:
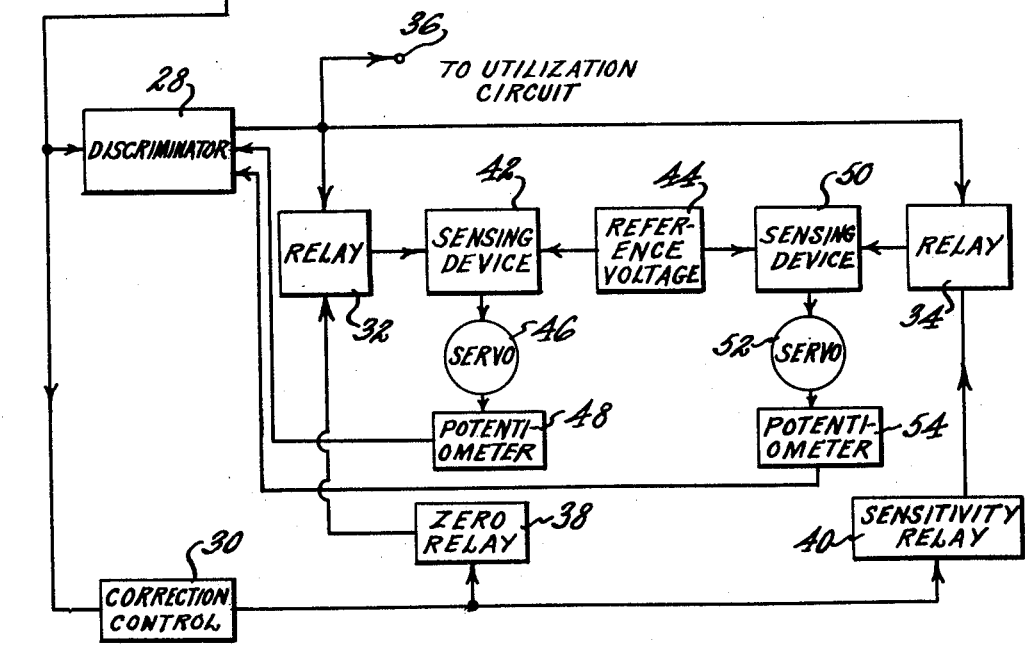
Figure 2 is a block diagram illustrating a portion of a telemetering receiving station in accordance with the present invention.

Referring particularly to Figure 2, there is illustrated in block diagram form a portion of a receiving station. The complex electrical signal from the transmitting station of the telemetering system is received by an antenna 24 and applied to a receiver 26. The output voltage from the receiver 16 is applied to a discriminator 28 and correction control means 30. The discriminator may be connected to relays 32, 34 and to other utilization circuits through an output terminal 36. Such utilization circuits may include indicators, recorders, converters, computers or other data handling devices.

The voltage output from the correction control means 30 is applied to a zero relay control means 38 and a sensitivity control relay 40. The zero control means 38 is connected to a sensing device 42 through the relay 32. A reference voltage is applied to the sensing device 42 from a source of reference voltage 44, which may include more than one reference voltage of different values. A servo control means 46 is actuated by an output voltage from the sensing device 42 to drive a shaft on a potentiometer 48. The potentiometer 48 is connected to the discriminator 28.

The sensitivity control relay 40 is connected to a second sensing device 50 through the relay 34. The source of reference voltages 44 is also connected to the sensing device 50. A second servo control means 52 is actuated by an output voltage from the sensing device 50 to drive a shaft on a second potentiometer 54. The potentiometer 54 is also connected to the discriminator 28.

In a system such as illustrated, assume that calibration signals are being received. The receiver 26 may include filter means for separating each of the sub-carrier signals and applying them to separate discriminators, such as the discriminator 28. The filter means may be directly associated with the discriminator, if desired. Although only one such discriminator is illustrated, it is realized that as many as 18 or more discriminators may be employed, dependent upon the number of channels in the telemetering system.

First assume that calibration signals representing the center frequency of a sub-carrier oscillator (such as the oscillator 14 illustrated in Figure 1) is applied to the discriminator 28.

The discriminator 28 has a zero output voltage when it is properly balanced to the center frequency and a voltage other than zero when it is unbalanced. An identification or control signal (such as may be originated from the source 16 and the oscillator 18 illustrated in Figure 1) coinciding in time with the transmission of the center frequency calibration signal is applied from the receiver 26 to the correction control means 30. The output voltage from the correction control means 30 is applied to the zero relay 38. The relay 38 actuates the second relay 32 which connects the appropriate portion of the output circuit of the discriminator 28 to the sensing device 42. The relays designated by the blocks may include a plurality of relay devices rather than a single relay. The sensing device 42 compares the voltage output from the discriminator 28 with a reference voltage from the reference voltages source 44 and provides a differential voltage which is the difference between the output voltage from the discriminator and the reference voltage. The reference voltage may be equal to zero during the center frequency calibration of the discriminator 28.

A servo control means 46, which may be a selsyn or other type motor, is adapted to be actuated by the application of a voltage thereto. The direction of the actuation of the motor will depend upon the polarity of the voltage applied thereto. It is seen that if the output voltage from the discriminator 28 is equal to zero and the reference voltage is equal to zero no differential voltage will be provided to actuate the servo means 46. At this point, the discriminator 28 is properly balanced for the center frequency of the incoming sub-carrier oscillator signal. When the discriminator 28 is unbalanced, an output voltage is applied to the sensing device 42 and a differential voltage between the output voltage and the reference voltage is provided. Upon the application of a voltage thereto, the servo means 46 drives a shaft on the potentiometer 48. The resistance associated with the potentiometer 48 affects the discriminator 28 to change its output voltage and to reduce the value of the differential voltage applied to the servo means 46. The action of reducing the differential voltage is continued until the output voltage of the discriminator equals the zero reference voltage. At this point, the discriminator is properly balanced to the center frequency of the sub-carrier oscillator at the transmitting station of the telemetering system.

Assume now that the calibration signals for sensitivity adjustment is applied to the discriminator 28. It has been stated that a predetermined voltage, such as 5 volts, may be applied to a sub-carrier oscillator during this portion of the calibration cycle. In designing the telemetering system, it is necessary to determine what the voltage output from a discriminator should be when a predetermined voltage is applied to its associated sub-carrier oscillator at the transmitting end. A reference voltage corresponding to this predetermined voltage is provided at the receiving station for calibration purposes.

The output voltage from the discriminator 28 is applied to the sensing device 50 through the relay 34. An identification or code signal, corresponding in time to the sensitivity calibration control signal, is applied from the correction control means 30 to the sensing device 50 through the sensitivity relay 40 and the relay 34. A reference voltage from the source 44 is also applied to the sensing device 50. The reference voltage, for example, may be 10 volts to correspond to the proper output voltage from the discriminator 28 when the predetermined voltage is applied to the sub-carrier oscillator at the transmitter.

The sensing device 50 compares the output voltage from the discriminator 28 with the 10 volt reference voltage to produce a differential voltage which actuates the servo means 52 which in turn may be used to drive a shaft on the potentiometer 54. The potentiometer 54 is driven to vary the output voltage from the discriminator 28 to decrease the differential voltage actuating the servo means 52. When the output voltage from the discriminator 28 is equal to 10 volts or to the reference voltage, the movement of the servo means 52 will stop and the sensitivity of the discriminator 28 will be properly adjusted.

The correction control means 30 may be a separate discriminator utilized for identification, correction, control or for other calibration purposes. In such a case the output voltage from the discriminator may be of opposite polarities to sequentially actuate the relays 38 and 40. Other correction control means may be employed in the place of such a separate discriminator.

Upon completion of the calibration cycle, the discriminator 28, as well as other discriminators within the system, receives the information signals representing the voltage at a pickup. The correction control means will not be actuated since no identification or control signals are transmitted.

Referring particularly to Figure 3, a correction control discriminator 56, which is a type of device which may be included in the correction control means 30 illustrated in Figure 2, receives calibration control or identification signals during the calibration cycle from the receiver 26. The output circuit of the discriminator 56 includes a differential relay 58, including a pair of windings 60 and 62. Polarized relays may also be used in the place of the relay 58. A movable contact arm 64 is disposed between the windings 60 and 62 and is adapted to short out one of a pair of contacts 66 or 68, dependent upon its direction of movement.

The discriminator 28 may be one of a plurality of discriminators in a telemetering system which ordinarily receives information signals from the receiver 26 and which must be periodically calibrated.

The output circuit of the discriminator 28 includes the sensitivity control relay 40 including a pair of movable contacts 72 adapted to close when actuated by current through a relay coil 74. When the contacts 72 are closed, a coil 76 is included in the output circuit of the discriminator 28. Current flows through the relay coil 74 from a battery 75 when the movable contact arm 64 shorts out a contact 68.

The output circuit of the discriminator 28 further includes the zero relay control means 38 having a pair of movable contacts 78 adapted to close when actuated by current through a relay coil 80. When the contacts 78 are closed, a differential relay 32 comprising windings 84 and 86 is included in the output circuit of the discriminator 28. Current will flow in the relay coil 80 from the battery 75 when the movable arm 64 shorts out a contact 66.

The potentiometer 54 having a movable contact arm 90 is included in the output circuit of the discriminator 28 to control its output voltage or sensitivity. The output voltage from the discriminator 28 may be supplied to a subsequent utilization stage in the receiving station through the output terminal 36.

The second potentiometer 48 having a movable contact arm 96 is associated with the discriminator 28 to balance the discriminator for the center frequency of a sub-carrier oscillator at the transmitting station.

The movable arm 90 of the potentiometer 88 is mechanically coupled to the servo motor 52, as indicated by a dotted line 100. The motor may be of the reversible type which may be actuated by a voltage from a battery 102. The voltage from the battery 102 is supplied to the motor 52 when a movable arm 104 is moved to short out one of two contacts 106 or 108. A source of reference potential is provided by a battery 110 which supplied current for a winding 112.

The movable arm 96 of the potentiometer 48 is mechanically coupled to the servo motor 46, as indicated by a dotted line 116. The motor 46 may be actuated by a voltage from a battery 118. The voltage from the battery 118 is applied to the motor 46 when a movable arm 120 associated with the differential relay 32 is moved to contact either one of contacts 122 or 124.

In considering the operation of the automatic compensation system shown, first assume that the calibration signals for balancing the discriminator 28 for the center frequency of a sub-carrier oscillator is received from the receiver 26 and applied to the discriminator 28. A calibration control or identification signal is applied to the correction control discriminator 56 during the same time interval that the calibration signal is applied to the system in order to connect the appropriate output circuit to the discriminator 28 during the calibration cycle.

Application of zero volts, for example, to the sub-carrier oscillator 18 (Figure 1) will shift its center frequency so that the voltage output from the discriminator 56 across the differential relay 58 will be of a predetermined polarity. The current through the windings 60 and 62 is such that when the identification signal is received, the arm 64 moves towards the contact 66. The circuit through the relay coil 80 is closed permitting current from the battery 75 to flow therethrough. The current in the relay coil 80 causes the contacts 78 to close thereby connecting the discriminator 28 to an output circuit comprising the differential relay 32. The discriminator 28 is now ready to be balanced or calibrated to the center frequency of a sub-carrier oscillator, such as the voltage control oscillator 14, illustrated in Figure 1.

If the oscillator 14 drifts from its normal center frequency, an output voltage will be developed across the windings 84 and 86 of the differential relay 32. The polarity of the voltage and the direction of the current through the differential relay 32 will be dependent upon the direction of the drift of the sub-carrier oscillator 14 from its center frequency.

When the voltage across the windings 84 and 86 is of one polarity, the movable arm 120 will be attracted to the contact 122. When the voltage across the windings 84 and 86 is of the opposite polarity, the arm 120 will be attracted to the contact 124.

When the arm 120 closes with the contact 122, the motor 46 will be actuated in a certain direction due to the application of voltage from the battery 118. The motor 46 may be mechanically connected to drive a shaft on the potentiometer 48 to move the arm 96. The potentiometer 48 is used to balance or adjust the discriminator 28 to the center frequency of the oscillator 14. The motor 46 adjusts the potentiometer to reduce the voltage output across the differential relay 32. The arm 120 maintains contact with the contact 122 until the voltage developed across the relay 32 is zero and no current flows through the windings 84 and 86. With zero voltage developed across the relay 32, the discriminator 28 is properly balanced and is ready for sensitivity adjustment.

If the drift in the center frequency of the oscillator 14 is opposite to the drift occurring in the example just described, the arm 120 will close with the contact 124, due to a voltage of opposite polarity being developed across the relay 32. The motor 46, in this case, will be actuated in a direction opposite to that previously described; since a voltage of opposite polarity is applied from the battery 118. The potentiometer 48 is then adjusted in a direction opposite to the direction previously indicated to reduce the voltage across the differential relay 28 until the voltage reaches zero. At this point, the discriminator 28 is properly balanced and is ready for sensitivity adjustment.

A second identification or calibration control signal is then applied to the correction control discriminator 56 for sensitivity adjustment. The second identification signal may be originated at the voltage control oscillator 18 illustrated in Figure 1. This signal may result from the application of 5 volts, for example, to the oscillator 18. The second identification, coinciding in time with the sensitivity calibration signal applied to the discriminator 28, produces an output voltage across the differential relay 58 which causes the movable arm 64 to close the contact 68. Current then flows through the relay coil 74 causing the contacts 72 to close. Closing of the contacts 72 connects the coil 76 in the output circuit of the discriminator 28.

The telemetering system is generally designed so that a predetermined reference voltage, such as 5 volts for example, applied to voltage control oscillator, such as the oscillator 14 illustrated in Figure 1, will produce a predetermined output voltage across the winding 76 when the sensitivity of the discriminator 28 is properly adjusted. Adjustment of the sensitivity is necessitated not only by a change in the center frequency to which a discriminator may be balanced but also to compensate for changes in amplification or attenuation occurring with the system.

In order that the output voltage across the winding 76 may be compared with the predetermined voltage which should be produced across the winding, a source of reference voltage is provided. The source of reference voltage includes the battery 110, which may be 10 volts or other predetermined value, and the coil 112.

When the output voltage across the winding 76 is different than the reference voltage provided by the battery 110, the movable arm 104 will move towards either the contact 106 or the contact 108 dependent upon whether the output voltage across the winding 76 is above or below the reference voltage provided by the battery 110.

When the output voltage across the winding 76 is less than the reference voltage provided by the battery 110, the resultant greater current through the winding 112 will cause the arm 104 to close the contact 106. The voltage from the battery 102 thereupon will be applied to the motor 52 causing it to move in a predetermined direction. The motor 52 may be mechanically connected to a shaft of the potentiometer 54 to vary the position of the arm 90. The direction of the movement of the potentiometer arm 90 is such that the differential output voltage across the coil 76 and the reference voltage from the battery 110 is reduced. The arm 104 maintains contact with the contact 106 until the differential voltage is equal to zero. At this point, the sensitivity of the discriminator 28 is properly adjusted.

It is seen that if the output voltage across the coil 76 is greater than the reference voltage that the arm 104 will contact the contact 108. Since the voltage from the battery 102 applied to the motor 52 is opposite in polarity from the example previously given, the direction of the movement of the motor 52 will be opposite. The potentiometer 54 will be adjusted in the opposite direction to reduce the differential voltage between the output voltage across the coil 76 and the reference voltage provided by the battery 110. Adjustment of the potentiometer 54 again continues until the output voltage from the discriminator 28 equals the reference voltage provided by the battery 110 thereby adjusting the sensitivity of the discriminator 28.

Referring particularly to Figure 4, there is shown a schematic representation of a discriminator output circuit used in a modern type telemetering system. This circuit represents a portion of one leg of a parallel or twin T type discriminator circuit, it being understood that a similar circuit may be used as the other leg or parallel branch of the discriminator circuit. This circuit is an example of one of many types of discriminator circuits which may be embodied in the present invention. Twin T types of discriminators are known. Such discriminators generally include an amplifier in one parallel branch which has maximum amplification for frequencies above a sub-carrier band of frequencies. The second parallel branch generally includes an amplifier having maximum amplification for frequencies below the sub-carrier band of frequencies. The gain for both branches is equal at the center frequency of the sub-carrier band. The differential voltage between the output voltages of the two parallel branches, represents the detected D.C. voltage.

The output voltage from the main portion of the discriminator circuit is applied to a pair of diode detectors 126 and 128 through a coupling capacitor 130. The detector rectifies the amplitude modulated sub-carrier signal received from the main portion of the discriminator circuit. The output voltage from the diodes is applied to a low pass filter 132. The output voltage from the filter 132 is applied to an amplifier comprising a triode vacuum device 134.

Bias for the detectors is provided by a resistor-capacitor network 136 including a potentiometer 138. The potentiometer 138 is used as a center frequency balance control and may be adjusted during the calibration cycle in a manner such as described in connection with Figures 2 and 3. Bias is also provided for diode detectors in the other branch of the T discriminator branch not shown.

The output voltage from the amplifier device 134 may be applied to a utilization circuit through a potentiometer 140 which controls the amplitude or output voltage of the discriminator. During the calibration cycle the output voltage may be varied to correspond to a reference voltage in a manner such as described in connection with Figures 2 and 3 and includes an adjustment of the potentiometer 54. Thus it is seen that the sensitivity of the discriminator may be adjusted.

Figure 5:
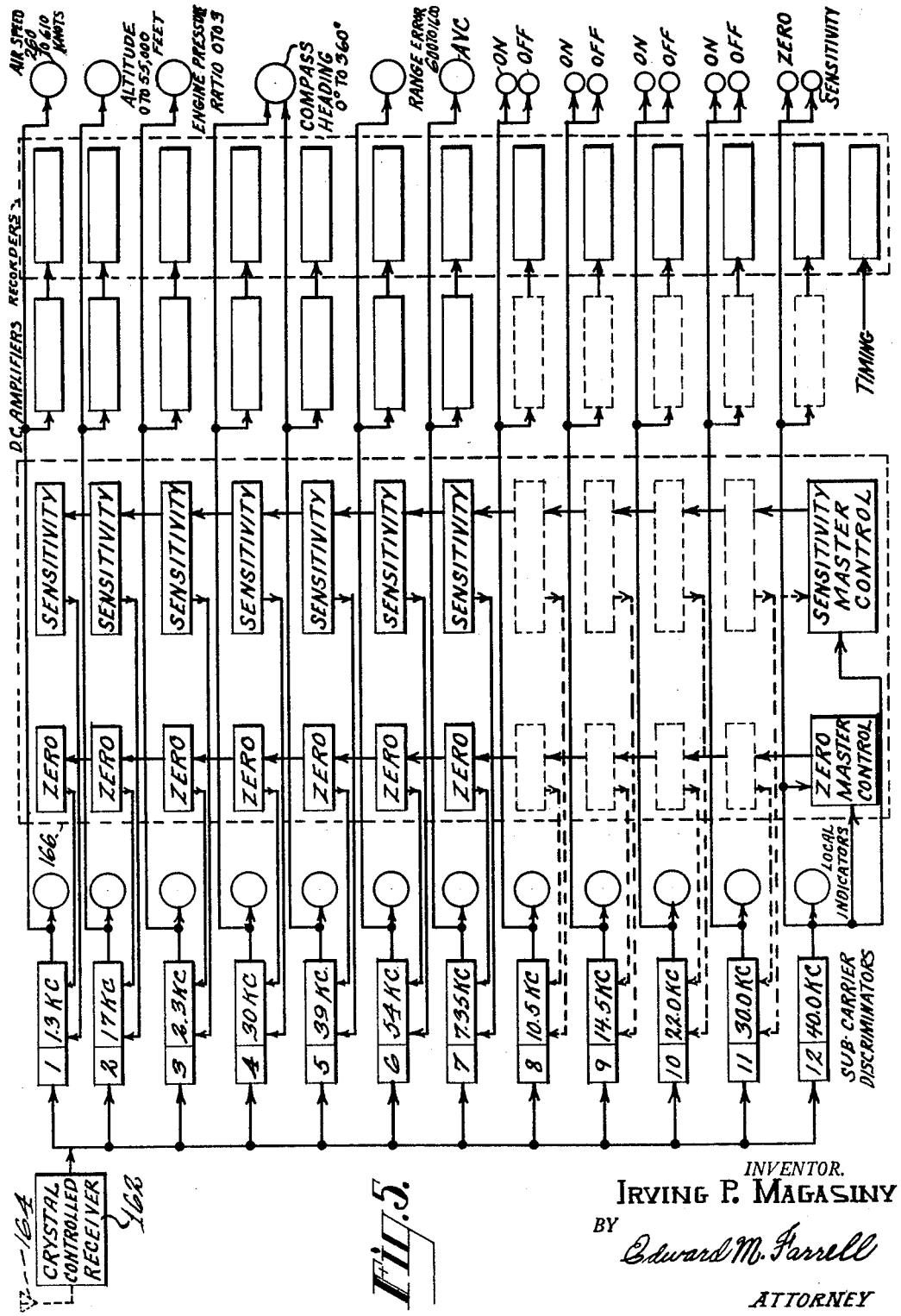
Figure 5 is a block diagram illustrating a complete telemetric station, in accordance with the present invention.

Referring particularly to Figure 5, there is illustrated in block diagram form a portion of a complete telemetering receiving station.

A complex carrier signal, comprising a plurality of sub-carrier signals received from a transmitting station is applied to a crystal controlled receiver 162 through an antenna 164. After suitable filtering, each of the sub-carrier signals is applied to sub-carrier discriminators 1 to 12. The discriminators may be balanced for center frequencies 1.3 kilocycles to 40.0 kilocycles, as indicated. In the embodiment shown, the sub-carrier discriminator numbered 12 is balanced for 40.0 kilocycles and may be used to receive control or identification signals, such as described in connection with the correction control discriminator 56 illustrated in Figure 3.

The output voltages from the sub-carrier discriminators may be applied to individual local indicators, if desired. The output voltages from the discriminators are also directly applied to a plurality of remote indicators which may give the actual values of the variable quantities associated with the transducers or pickups at the transmitting station. The remote indicators may be used to indicate air speed, altitude, engine pressure, compass heading and other functions associated with a guided missile or other type aircraft, for example.

The output voltages from the discriminators may also be applied to multichannel recorders through a plurality of D.C. amplifiers, if desired.

An automatic drift and sensitivity compensator, designated by a dotted box 166, is included to balance and adjust the sensitivity of the discriminators numbered 1 to 11. The operation of the compensator is substantially the same as that described in connection with the system illustrated in Figures 2 and 3.

The output voltage from the discriminator numbered 12 is applied to a zero master control and a sensitivity master control. The zero master control connects the appropriate output circuitry of the discriminators numbered 1 to 11, to provide means for balancing or compensating the discriminators during the calibration cycle in a manner similar such as shown and described in Figure 3 in connection with the discriminator 56. The zero master control may be a differential relay 58 shown in Figure 3 or other suitable device or circuitry.

During the calibration cycle, the zero master control may be first actuated. During this period the output voltage from the discriminators may be compared with a zero voltage reference level. When any of the output voltages from the discriminators are not zero, the differential voltage is utilized to control the balancing of the discriminators until the output voltages are substantially equal to zero. At these points, the discriminators are balanced for the center frequencies of their respective sub-carrier oscillators at the transmitter.

Following the period of calibration for balancing the discriminators for their respective center frequencies, the sensitivity master control may be actuated. During this period of the calibration cycle, the output voltages from the discriminator are compared to reference voltages such as previously described in connection with Figure 3. The output voltages from the discriminators numbered 1 to 11 are adjusted until they are equal to their respective reference voltages.

It is noted that some of the channels in the telemetering system may be employed to indicate off-on functions while others may be used to indicate continuously varying functions. The channels relating to off-on functions are often not too critical and compensation for the discriminators associated with such functions may be omitted if desired.

In practicing the present invention, various modifications are possible. For example, various types of discriminator circuts may be employed. Some of the circuits commonly known as Travis discriminators, Foster-Seely type discriminators, counter discriminators, parallel-T discriminators, pulse averaging discriminators and numerous other types of discriminators may be adapted for use with the present invention.

Other impedance elements, other than a resistance associated with a potentiometer may, in some cases, be associated with a discriminator circuit, with the values thereof varied during the calibration cycle to achieve balancing or sensitivity adjustments. Although batteries are shown, it is realized that any suitable source of operating potential may be employed.

Additional elements or devices may be added to the system shown and described. The use of such additional elements have not been shown or described in detail since their use of such systems is obvious to those skilled in the art. For example, various servo amplifiers have not been shown. Also means included in the servo system for braking the motors or to prevent over-shooting when the system is properly calibrated have not been shown in the interest of simplicity.

A single shaft from a single motor may be employed to actuate more than one potentiometer, if desired. In such cases, devices employing magnetic clutches actuated by different control signals may be employed to actuate the proper motor to drive the proper potentiometer during the calibration period.

Although a system employing two point calibration has been described, it is recognized that a 3, 5 or other point calibration may be employed in practicing the present invention.

It is seen that the present invention has provided a relatively simple means for providing automatic compensation for discriminator circuits in a telemetering system. The compensation provided assures a highly accurate telemetering system without the necessity of adjustments or calculations to compensate for the frequency drifts of the sub-carrier oscillators at the transmitting station or to compensate for other variations within the system.

What is claimed is:

1. In combination, means for calibrating a receiver in a telemetering system during a predetermined calibration period comprising means including a plurality of sub-carrier oscillators for sequentially transmitting a plurality of pairs of calibration signals to said receiver, means for transmitting at least two control signals simultaneously with said calibration signals, one of each of said pairs of calibration signals representing the center frequencies of said sub-carrier oscillators, the second of each of said pairs of calibration signals representing the frequencies of said sub-carrier oscillators shifted from their center frequencies, the frequency shifting of said sub-carrier oscillators being provided by the application of predetermined increments of voltages thereto, a plurality of discriminator circuits associated with said receiver, a first potentiometer associated with each of said discriminator circuits, said first potentiometer providing a center frequency control for each of said discriminator circuits, a first driving means associated with said first potentiometer, a first relay circuit responsive to the calibration signals representing said center frequencies of said sub-carrier oscillators to actuate said first driving means to adjust said first potentiometer to balance each of said discriminator circuits to its respective center frequency, a second potentiometer providing a sensitivity control for each of said discriminator circuits, a second driving means associated with said second potentiometer, and a second relay circuit responsive to the second of each of said pairs of calibration signals to actuate said second driving means to adjust said second potentiometer providing the sensitivity control for each of said discriminator circuits.

2. In a telemetering system, means for calibrating a receiver included in said telemetering system during a predetermined calibration period comprising means including a plurality of sub-carrier oscillators for sequentially transmitting a plurality of pairs of calibration signals to said receiver, means for transmitting two control signals simultaneously with said calibration signals, one of each of said pairs of calibration signals representing the center frequencies of said sub-carrier oscillators, the second of each of said pairs of calibration signals representing the frequencies of said sub-carrier oscillators shifted from their center frequencies, the frequency shifting of said sub-carrier oscillators being provided by the application of predetermined increments of voltages thereto, a plurality of discriminator circuits associated with said receiver, a first potentiometer associated with each of said discriminator circuits, said first potentiometer providing a center frequency control for each of said discriminator circuits, a first driving means associated with said first potentiometer, a first relay circuit responsive to one of said control signals to provide means for applying the calibration signals representing said center frequencies of said sub-carrier oscillators to actuate said first driving means to adjust said first potentiometer to balance each of said discriminator circuits to its respective center frequency, a second potentiometer providing a sensitivity control for each of said discriminator circuits, a second driving means associated with said second potentiometer, and a second relay circuit responsive to the second of said control signals to provide means for applying the second of each of said pairs of calibration signals to actuate said second driving means to adjust said second potentiometer providing the sensitivity control for each of said discriminator circuits.

3. The invention, as set forth in claim 2, wherein said means for transmitting two control signals comprises a sub-carrier oscillator.

References Cited in the file of this patent

UNITED STATES PATENTS

| | | |
|---|---|---|
| 1,780,669 | Bruckel | Nov. 4, 1930 |
| 1,794,932 | Usselman | Mar. 3, 1931 |
| 2,008,832 | Leonard | July 23, 1935 |
| 2,412,039 | Fyler | Dec. 3, 1946 |
| 2,417,543 | Chapin | Mar. 18, 1947 |
| 2,423,225 | Chapin | July 1, 1947 |
| 2,464,193 | Wild | Mar. 8, 1949 |
| 2,567,896 | Semm | Sept. 11, 1951 |
| 2,591,600 | Pear | Apr. 1, 1952 |
| 2,629,776 | Terry | Feb. 24, 1953 |
| 2,663,855 | Beggs | Dec. 22, 1953 |
| 2,669,604 | Heuschmann | Feb. 16, 1954 |
| 2,684,472 | Avvil | July 20, 1954 |
| 2,753,546 | Knowles | July 3, 1956 |
| 2,753,547 | Donath | July 3, 1956 |